3,455,958
WATER-SOLUBLE ANTHRAQUINONE
DYESTUFFS
Jean-Frederic Guye-Vuilleme, Basel, Switzerland, assignor to Ciba Limited, Basel, Switzerland, a company of Switzerland
No Drawing. Filed Dec. 20, 1966, Ser. No. 603,131
Claims priority, application Switzerland, Dec. 31, 1965, 18,148/65; Nov. 24, 1966, 16,931/66
Int. Cl. C07d 7/18; C09b 1/02; D06p 3/36
U.S Cl. 260—345.2                                                 5 Claims

ABSTRACT OF THE DISCLOSURE

Water-insoluble anthraquinone dyestuffs of the formula

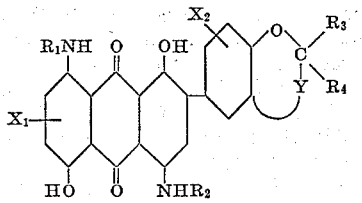

in which $R_1$ and $R_2$ each represents a hydrogen atom or an unsubstituted or substituted alkyl group, $R_3$ and $R_4$ each represents an alkyl group, Y a 2-membered saturated or preferably unsaturated alkylene group substituted by at least one alkyl radical, $X_1$ and $X_2$ each represents a hydrogen or halogen atom, are obtained by reacting a boric acid ester of a compound of the formula

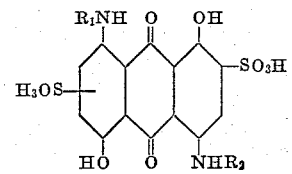

with a compound of the formula

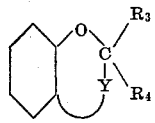

desulphonating the resulting condensation product and, if desired, treating it with halogenating and/or alkylating and acylating agents.

The dyestuff of the above formula dye polyester fibers blue to greenish blue shades having excellent fastness to light and sublimation.

---

The present invention is based on the observation that new, valuable water-insoluble anthraquinone dyestuffs of the formula

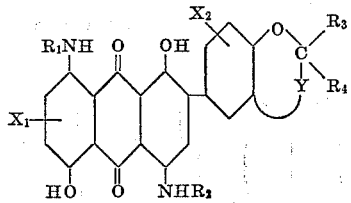

in which $R_1$ and $R_2$ each represents a hydrogen atom or an unsubstituted or substituted alkyl group, $R_3$ and $R_4$ each represents an alkyl group, Y a 2-membered saturated or preferably unsaturated alkylene group substituted by at least one alkyl radical, $X_1$ and $X_2$ each represents a hydrogen or halogen atom, may be obtained by reacting a boric acid ester of a compound of the formula

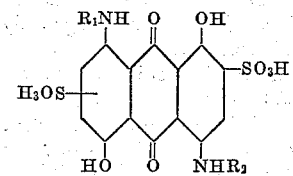

with a compound of the formula

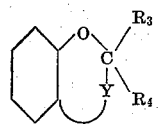

desulphonating the resulting condensation product and, if desired, treating it with halogenating and/or alkylating and acylating agents.

Preferred starting materials are boric acid esters of 1,5-dihydroxy-4,8-diaminoanthraquinone-2,6-disulphonic acid. These esters are advantageously reacted with chromanes and/or chromenes of the formula

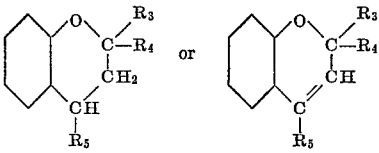

in which $R_3$, $R_4$ and $R_5$ each represents an alkyl radical, especially a methyl radical. The following chromanes may be mentioned as examples: 2,2,4-trimethylchromane, 2,2,4-trimethyl-3,4-dehydrochromane and 2,2,3-trimethylchromane.

The reaction of the boric acid esters of the diaminoanthrarufin-disulphonic acids with chromanes is preferably carried out in sulphuric acid of a concentration advantageously from about 85 to 98%. The reaction is preferably carried out at a temperature in the vicinity of room temperature or below, for example at 0 to 15° C. or at —5° C. The elimination of the sulphonic acid groups is then carried out by a known method, for example by treatment with sodium dithionite.

The anthraquinone dyestuffs obtained in this manner may be converted into the corresponding halogenated dyestuffs by treatment with a halogenating agent, for example chlorine or preferably bromine, the halogenation being advantageously carried out in an inorganic or organic diluent, for example in sulphuric acid, acetic acid, chlorobenzene or nitrobenzene. The dyestuffs thus obtained preferably contain 0.25 to 1.5 halogen atoms per dyestuff molecule.

If it is desired to introduce unsubstituted or substituted alkyl radicals into the dyestuffs obtained by the present invention they may be treated with alkylating hydroxyalkylating or aralkylating agents, for example with ethyl bromide, ethyl chloride, ethylene chlorohydrin or benzyl chloride, or with alkylsulphonic acid esters for example para-toluenesulphonic acid methyl ester, alkyl sulphates for example dimethyl sulphate or diethyl sulphate, aldehydes, especially formaldehyde, alkylene oxides for example ethylene oxide or epichlorohydrin, or acrylonitrile. The dialkyl sulphates may be replaced with equal success by a mixture containing an aliphatic alcohol, especially methanol or ethanol, and sulphuric acid.

The alkylation is advantageously effected by heating in an inert organic solvent, for example a halogenated hydrocarbon for example chlorobenzene, ortho-dichlorobenzene, a nitrated hydrocarbon for example nitrobenzene or a nitronaphthalene, a hydroxybenzene for example phenol or cresol, an acid amide for example dimethylformamide or N-methylpyrrolidone, or dimethylsulphoxide. When the alkylation is carried out with an alkyl halide, it is advantageous to add an acid acceptor, for example an alkali metal carbonate.

The hydroxyalkylation may be advantageously carried out by heating with a chloroformic acid ester of the corresponding halogenalcohol, advantageously in the presence of an acid acceptor, for example an alkali metal carbonate or acetate. The chloroformic acid ester to be used is preferably one of a lower aliphatic $\alpha$-, $\beta$- or $\alpha,\gamma$-halogenalcohol, for example of ethylenechlorohydrin, 1-chloro-2-hydroxypropane, 2-chloro-3-hydroxypropane, 1-chloro-3-hydroxypropane, 1-chloro-2-hydroxybutane or 3-chloro-4-hydroxybutane. It is of advantage to use 2 to 6 mols, preferably 3 to 5 mols, of the chloroformic acid ester for every mol of the dihydroxydiaminoanthraquinone. With these molecular proportions one hydroxyalkyl group on an average is generally introduced.

The reaction of the dihydroxydiaminoanthraquinone with the chloroformic acid ester is carried out by the method described in Chemical Abstracts 51, page 7018 [1957] in a high-boiling point organic solvent, for example chlorobenzene, nitrobenzene or pyridine. It is assumed that in this reaction at least one amino group of the dihydroxydiaminoanthraquinone reacts with the chloroformic acid chloralkyl ester to form a heterocycle of the formula

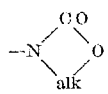

accompanied by the elimination of 2 mols of hydrogen halide. When the intermediate obtained in this manner is heated with an aqueous alkali metal hydroxide solution, the ring is hydrolyzed and the corresponding hydroxyalkylaminoanthraquinone is formed accompanied by elimination of carbon dioxide.

The resulting alkylation product is advantageously worked up by removing the solvent by direct distillation and dilution of the distillation residue with water, or by removing the solvent by steam distillation. The dyestuff, which settles out, can be separated by filtration.

The resulting hydroxyalkylaminoanthraquinones can be converted into the corresponding acyloxyalkylaminoanthraquinones by treatment with an acylating agent, especially a halide or anhydride of a lower aliphatic carboxylic acid, for example acetic anhydride.

The new dihydroxydiaminoanthraquinones or their derivatives obtained by the present invention are valuable dyestuffs which display an excellent affinity for polyester fibres, especially polyethylene terephthalate fibres, and they dye these fibers pure blue to greenish blue tints of excellent fastness to light and sublimation. Moreover, the new dyestuffs resist cotton very well.

In many cases it is advantageous to use mixtures of the dyestuffs of this invention, especially dyestuff mixtures obtained by reacting 1,5-dihydroxy-4,8-diaminoanthraquinone-2,6-disulphonic acid with a mixture consisting of 2,2,4-trimethylchromene-3 and 2,2,4-trimethylchromane Such mixtures display a better affinity than the individual dyestuffs. For dyeing, the new dyestuffs are advantageously used in a finely disperse form, and dyeing is carried out in the presence of a dispersant for example soap, sulphite cellulose waste liquor or a synthetic detergent, or a combination of different wetting and dispersing agents may be used. As a rule it is advantageous to convert the dyestuff before dyeing into a dye preparation containing a dispersant and the finely disperse dyestuff in a form such that when the dye preparation is diluted with water a fine dispersion is obtained. Such dye preparations may be prepared in known manner, for example by reprecipitating the dyestuff from sulphuric acid and grinding the resulting fine suspension with sulphite cellulose waste liquor, or by grinding the dyestuff dry or wet in highly efficient grinding machines, with or without addition of a dispersant during the grinding operation.

By virtue of their fastness to alkalies the new dyestuffs lend themselves particularly well to dyeing by the so-called thermofixing process according to which the fabric to be dyed is impregnated at a temperature advantageously not exceeding 60° C. with an aqueous dispersion of the dyestuff which advantageously contains 1 to 50% of urea and a thickener, especially sodium alginate, whereupon the fabric is squeezed in the usual manner; advantageously, the fabric is squeezed so that it retains 50 to 100% of dye liquor referred to its own dry weight.

To fix the dyestuff the fabric impregnated in this way is advantageously dried, for example in a current of warm air, and then heated to a temperature above 100° C., for example to 180 to 220° C.

The thermofixing process referred to is of special value in the dyeing of mixed fabrics containing polyester fibres and cellulose fibres, especially cotton. In this case the padding liquor contains in addition to the dyestuffs of this invention also dyestuffs suitable for dyeing cotton, especially vat dyes, or reactive dyestuffs, that is to say, dyestuffs that can be fixed on the cellulose fibre with formation of a chemical bond, for example dyestuffs that contain a chlorotriazine or chlorodiazine residue. In the latter case it is advantageous to add to the padding liquor an acid acceptor, for example an alkali metal carbonate, phosphate, borate or perborate, or a mixture thereof. When vat dyes are used, the padded fabric requires after the heat treatment a treatment with an aqueous alkaline solution of one of the reducing agents generally employed in vat dyeing.

It is advantageous to subject the resulting dyeings to an after-treatment, for example by heating them with an aqueous solution of a nonionic detergent.

The dyestuffs may be applied to the fabric by printing instead of impregnating. For this purpose a printing paste is used which contains, for example, the finely dispersed dyestuffs together with the assistants generally used in printing, for example wetting and thickening agents. The mixture may also contain one of the cotton dyestuffs referred to above and if desired urea and/or an acid acceptor.

Unless otherwise indicated, parts and percentages in the following examples are by weight.

Example 1

20 parts of 1,5-dihydroxy-4,8-diaminoanthraquinone-2,6-disulphonic acid together with 10 parts of boric acid are dissolved in 400 parts of 96% sulphuric acid with stirring and heated to 75° C. The whole is cooled to —5° C. and then, within 45 minutes, 16 parts of 2,2,4-trimethylchromene-3 are dropped in, during which the colour changes from blue to brownish red. The mixture is then stirred for 20 minutes at —5° C., poured into 6,500 parts of ice water, heated to 100° C. and stirred at this temperature for 3 hours. The resulting monosulphonic acid is filtered and washed. To eliminate the sulphonic acid group the monosulphonic acid is poured into a mixture of 75 parts by volume of water and 50 parts by volume of pyridine, heated to 95° C. and 10 parts of sodium dithionite are added in portions. On completion of the reaction the dyestuff of the formula

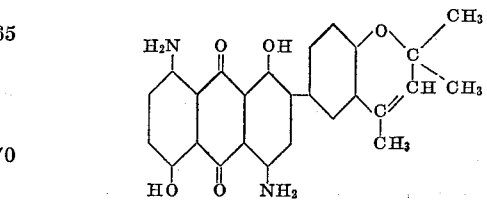

settles out quantitatively; it is filtered, washed and dried. It dyes polyethylene terephthalate fibres pure, strong blue tints of excellent fastness to light and sublimation.

When 2,2,4-trimethylchromene-3 is replaced by 2,2,4-trimethylchromane [obtained by catalytic hydrogenation of the 2,2,4-trimethylchromene-3 described in the literature] a dyestuff is obtained that dyes polyethylene terephthalate fibres pure blue tints of excellent fastness to light and sublimation.

Example 2

10 parts of the dyestuff obtained in Example 1 are dissolved in 100 parts of nitrobenzene under reflux, the solution is cooled to 100° C., a pinch of ferric bromide is added as catalyst and 6 parts of bromine are stirred in dropwise within 5 hours.

The mixture is then stirred for another 10 hours at this temperature, steam distilled, and the dyestuff, which is obtained in a good yield, is filtered and dried; it colours polyester fibres greenish blue tints of very good fastness to light and sublimation.

Example 3

60 parts by volume of pyridine are stirred into 6 parts of the dyestuff obtained as described in the first paragraph of Example 1. The mixture is refluxed until substantially all has dissolved and then cooled to room temperature. 9.15 parts of chloroformic acid chlorethyl ester are added dropwise during 45 minutes the solution turning red. The batch is refluxed for 1 hour and then 300 parts by volume of 20% sodium hydroxide solution are added dropwise. The whole is refluxed and stirred for another 4 hours, the pyridine is removed by steam distillation, 200 parts of water are added, and the whole is boiled for another 20 minutes and filtered while still hot. The resulting product is washed on the suction filter and then dried. The yield amounts to 6.9 parts by volume.

The resulting dyestuff of the formula

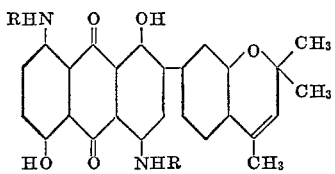

in which one R represents a hydrogen atom and the other R a hydroxyethyl group, colours polethylene terephthalate fibres from an aqueous dispersion pure blue tints of good fastness to light and sublimation.

Example 4

5.6 parts of the product of Example 3 are dissolved in 112 parts by volume of pyridine and while shaking 2.46 parts by volume of acetic anhydride are dropped into the solution. The whole is then refluxed for 65 minutes, diluted with a small quantity of water and the pyridine is expelled with steam. The product is filtered, washed and dried. The yield amounts to 5.5 parts. The resulting dyestuff of the formula

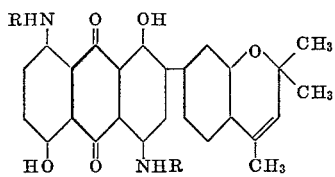

in which one R represents a hydrogen atom and the other R an acetoxyethyl group colours polyester fibres blue tints.

What is claimed is:
1. A water-insoluble anthraquinone dyestuff of the formula

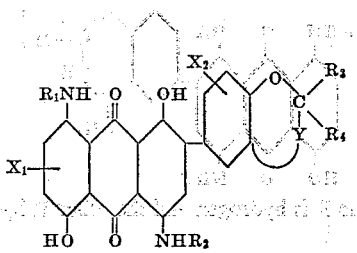

in which $R_1$ and $R_2$ each represents a hydrogen atom or a lower alkyl or lower hydroxy alkyl group, $R_3$ and $R_4$ each stands for a lower alkyl group, Y is a 2-membered saturated or unsaturated alkylene group having as sole substituent a lower alkyl group, $X_1$ and $X_2$ each represents a hydrogen or halogen atom.

2. A water-insoluble dyestuff as claimed in claim 1, selected from the group consisting of dyestuffs of the formulae

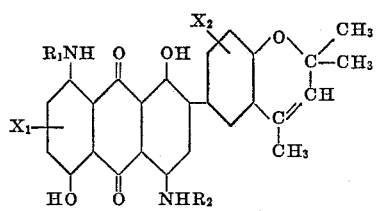

and

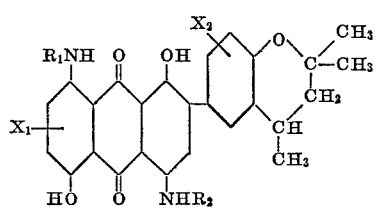

in which $R_1$ and $R_2$ represent hydrogen lower alkyl or lower alkoxy, $X_1$ and $X_2$ hydrogen, chlorine or bromine.

3. The dyestuff as claimed in claim 1 of the formula

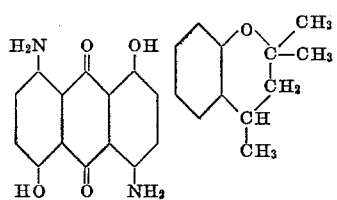

4. The dyestuff as claimed in claim 1 of the formula

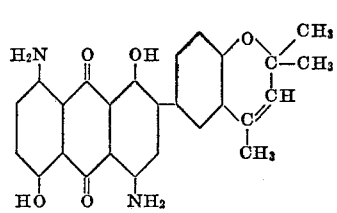

5. The dyestuff as claimed in claim 1 of the formula
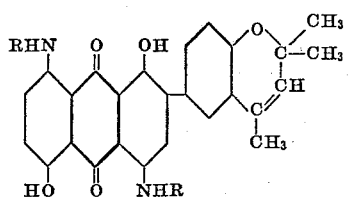
in which one R is hydrogen and the other R hydroxyethyl.
References Cited
UNITED STATES PATENTS
2,987,525   6/1961   Arrigo _____ 260—345.2
HENRY R. JILES, Primary Examiner
JOHN M. FORD, Assistant Examiner
U.S. Cl. X.R.
8—57

PO-1050
(5/69)

UNITED STATES PATENT OFFICE
CERTIFICATE OF CORRECTION

Patent No. 3,455,958          Dated July 15, 1969

Inventor(s) Jean-Frédéric Guye-Vuilleme

It is certified that error appears in the above-identified patent and that said Letters Patent are hereby corrected as shown below:

Column 6, the structural formula of claim 3 should read:

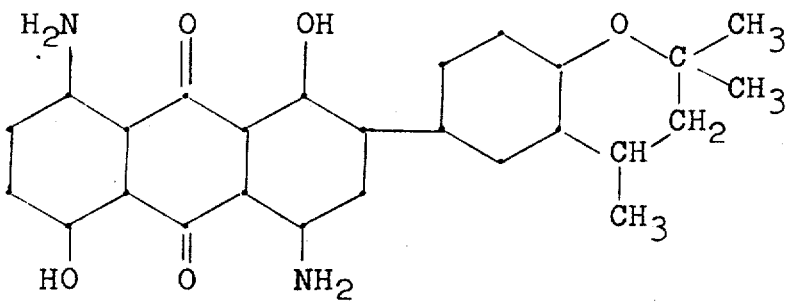

SIGNED AND
SEALED
JUN 23 1970

(SEAL)
Attest:

Edward M. Fletcher, Jr.
Attesting Officer

WILLIAM E. SCHUYLER, JR.
Commissioner of Patents